United States Patent [19]

De Jonge et al.

[11] Patent Number: 5,467,380
[45] Date of Patent: Nov. 14, 1995

[54] X-RAY EXAMINATION APPARATUS AND MEANS FOR NOISE REDUCTION FOR USE IN AN X-RAY EXAMINATION APPARATUS

[75] Inventors: Dirk J. A. De Jonge; Herman Stegehuis, both of Eindhoven, Netherlands

[73] Assignee: U.S. Philips Corporation, New York, N.Y.

[21] Appl. No.: 89,958

[22] Filed: Jul. 12, 1993

[30] Foreign Application Priority Data

Jul. 10, 1992 [EP] European Pat. Off. ............. 92202103

[51] Int. Cl.$^6$ ............................................... H05G 1/64
[52] U.S. Cl. ................................ 378/98.2; 364/413.13
[58] Field of Search ............. 378/69, 98.2; 364/413.13

[56] References Cited

U.S. PATENT DOCUMENTS

| 4,367,490 | 1/1983 | Riederer ........................... 358/167 |
| 4,677,478 | 6/1987 | Kruger et al. ..................... 378/98.12 |
| 5,296,937 | 3/1994 | Nahatani et al. ................. 358/448 |

FOREIGN PATENT DOCUMENTS

| 0289152 | 11/1988 | European Pat. Off. . |
| 0393621 | 10/1990 | European Pat. Off. . |
| 2575886 | 7/1986 | France . |

OTHER PUBLICATIONS

"Spatio–Temporal Motion Compensated Noise Filtering of Image Sequences" A. K. Latsaggelos et al, SPIE vol. 1199, Visual Communications and Image Processing, IV (1989).

Primary Examiner—David P. Porta
Assistant Examiner—David Vernon Bruce
Attorney, Agent, or Firm—Jack D. Slobod

[57] ABSTRACT

Noise reduction for use in an x-ray examination apparatus is provided for performing weighted temporally averaging in dependence on an amount of motion in parts of successive x-ray images. Further noise reduction is performed by combining temporal averaging with spatial filtering and motion detection. This reduces both noise breakthrough and the occurrence of trailers. In particular, noise breakthrough is appropriately reduced by hi-temporal filtering. Threshold-values for discriminating between noise and motion are computed on the basis of images generated by the x-ray detector.

20 Claims, 2 Drawing Sheets

X-RAY EXAMINATION APPARATUS AND MEANS FOR NOISE REDUCTION FOR USE IN AN X-RAY EXAMINATION APPARATUS

BACKGROUND OF THE INVENTION

1. Field of the Invention

The invention pertains to an x-ray examination apparatus for producing x-ray images and comprising means for noise reduction. The invention also relates to means for noise reduction suitable for use in an x-ray examination apparatus., 2. Description of the Related Art An x-ray examination apparatus of said kind is described in the U.S. Patent Specification U.S. Pat. No. 4,367,490.

In that document an x-ray examination apparatus is described which produces a time-sequence of x-ray images, i.e. it produces a sequence of successive x-ray images and converts said x-ray images into video signals having signal amplitudes in correspondence with brightness of picture elements (pixels) of the x-ray images. An x-ray examination apparatus known from the cited reference comprises means for noise reduction by recursively temporally averaging of pixel values. An important noise source in x-ray imaging is shot noise that is to be attributed to the quantised nature of the x-ray photons. By recursive temporally averaging images random noise can be suppressed, because uncorrelated information contained in an image is averaged out. However, when, in a medical x-ray examination motion is involved of e.g. the wall of a beating heart, or a catheter being moved by a physician, recursive temporally averaging leads to loss of image quality. In particular moving edges in the displayed images would have long trailers behind them. In an x-ray examination apparatus as described in the cited reference noise reduction is omitted for pixels which are involved in motion of a part of an object that is imaged. As a consequence noise-breakthrough occurs in parts of an image involving motion, i.e. noise is displayed in parts involved in motion in a displayed image.

SUMMARY OF THE INVENTION

It is inter alia an object of the invention to provide an x-ray examination apparatus having means for applying noise reduction in stationary parts of an image produced by the x-ray examination apparatus as well as in parts of the image involved in motion.

To achieve this, an x-ray examination apparatus in accordance with the invention is characterised in that said noise reduction means comprises means for weighted temporal averaging a temporal sequence of images, and motion detection means comprising means for generating weight factors for said weighted temporal averaging in dependence on differences between images of said sequence.

By the x-ray examination apparatus a sequence of successive images is produced. Noise reduction of said images is achieved by averaging. Motion detection is performed by comparing differences between pixel-values of corresponding pixels in successive images. Trailers and noise-tails in the displayed image are reduced by reducing the contribution to the averaging of preceding images regarding pixels involved in motion. Differences of pixel-values exceeding a predetermined threshold value are attributed to relevant pixels being involved in motion. Simultaneously, noise-breakthrough is reduced since some averaging is carried out even for pixels involved in motion. Careful balancing of averaging and omitting averaging achieves reduction of both trailers, noise-tails and noise-breakthrough.

A preferred embodiment of an x-ray examination apparatus in accordance with the invention is characterised in that said means for weighted temporally averaging a sequence of successive images is arranged for weighted temporal averaging pixel-values of corresponding pixels of images from a sequence of successive images, and said motion detection means comprising means arranged for generating weight factors for said weighted temporal averaging in dependence on differences between pixel-values of corresponding pixels of images of said sequence.

An advantage of performing noise reduction by processing pixel values is that comparatively simple circuit means can be employed for processing signal amplitudes in correspondence to pixel-values.

A further preferred embodiment of an x-ray examination apparatus in accordance with the invention is characterised in that said noise reduction means is arranged for correcting a predetermined image in said sequence of successive image by averaging said predetermined image with images from said sequence preceding said predetermined image and with images from said sequence succeeding said predetermined image.

In this preferred embodiment said noise reduction means comprises memory means, in the form of cascaded frame delay elements, for storing a time-sequence of images. An actual image is produced substantially at the end of said time-sequence. An actual image being displayed is generated by weighted temporal averaging corresponding pixel-values of images of said time-sequence. Because in the weighted temporal averaging images that precede and images that succeed a predetermined image in a time-sequence are employed, such averaging may be denoted as bi-temporal averaging.

A further advantage of bi-temporal averaging is that noise-breakthrough is avoided in places in a displayed image whereto a moving object has moved as well as a noise-tail is avoided in places in a displayed image wherefrom a moving object has moved away.

The motion detector means comprises subtraction means for computing differences between pixel-values of images being successive elements of said time-sequence. Should such a difference exceed a predetermined threshold value, then a former one of the pixel-values involved in computing said difference is left out of averaging the time-sequence. This provides the advantage that, on the one hand, trailers are avoided in the displayed image, but on the other hand, a considerable noise reduction is sustained because of averaging over the remainder of the time-sequence.

A further preferred embodiment of an x-ray examination apparatus in accordance with the invention is characterised in that said means for weighted temporal averaging is arranged for recursive temporally averaging.

Noise reduction of an x-ray image by way of recursive averaging is performed by repeatedly for each pixel-value of an image to be corrected, adding to a pixel-value of the x-ray image at issue, pixel-values of corresponding pixels in preceding images, multiplied by a weight factor. I.e. noise reduction is performed by recursive averaging consisting of geometric summation to an optional extent of corresponding pixel-values pertaining to a time-sequence of images preceding an image at issue.

A further preferred embodiment of an x-ray examination apparatus in accordance with the invention is characterised in that said noise reduction means comprises means for spatial filtering images and comprises computing means for computing a convex combination, in dependence of values of the weight factors generated by the motion detection means, of a weighted temporal averaged image and a corresponding spatial filtered image.

When a substantial majority of pixel-values of images in the time-sequence have differences exceeding said threshold value then so few, (possibly none) images in the time-sequence are involved in averaging that noise-breakthrough can occur. To prevent noise-breakthrough, spatial filtering is performed in dependence on the weight factors being determined by the motion detection means. Spatial filtering can be carded out in the form of spatial averaging, blurring weighted median filtering or median hybrid filtering. Pixel-values pertaining to a blurred image are computed by spatial filtering pixel-values of an image arising as a result of the weighted temporal averaging of the time-sequence. Subsequently there are computed convex combinations of pixel-values of the blurred image and pixel-values of the image arising as a result of the weighted averaging of the time-sequence. A convex combination of two images having pixel-values, $I_A$ and $I_B$, say, is defined as an image having pixel-values $I_C = \alpha I_A + \beta I_B$, where $\alpha + \beta = 1$. As a magnitude of weight factors produced by the motion detection means decreases, then a contribution of pixel-values pertaining to the blurred image in said convex combination is increased.

It is noted that independently combining temporal and spatial filtering per se for achieving noise reduction is known from the reference A. K. Katsaggelos et al., SPIE Visual Communications and Image Processing Vol.1199(1989)61–70.

A further preferred embodiment of an x-ray examination apparatus in accordance with the invention is characterised in that said noise reduction means further comprises threshold-determination means for computing a threshold-value for controlling weighted temporal averaging on the basis of pixel-values in portions of images generated by the x-ray detector.

In order to provide an accurate discrimination between noise and motion on the basis of differences of pixel-values of pixels pertaining to successive images in a time-sequence of images a threshold value must be determined. When differences of pixel-values exceed said threshold-value, then the difference at issue is attributed to motion. In order to rightly discriminate between noise and motion the threshold-value is preferably determined as a function of parameters describing the image at issue, e.g. brightness, contrast and artificial time-correlations caused by 'lag' of the imaging system. By way of said threshold-determination means an x-ray examination apparatus in accordance with the invention provides for discriminating between noise and motion in an adaptive way so as to avoid the motion detection means mistaking noise for motion or vice versa.

A noise reduction means suitable for use in an x-ray examination apparatus preferably comprises mean, for weighted temporal averaging a set of images and motion detection means for generating weight factors for use in said weighted temporally averaging in dependence on differences between elements of said set of images.

These and other aspects of the invention will become apparent from and elucidated with reference to the embodiments described hereinafter, with reference to the accompanying drawing.

DETAILED DESCRIPTION OF THE PREFERRED EMBODIMENTS

Figure 1:
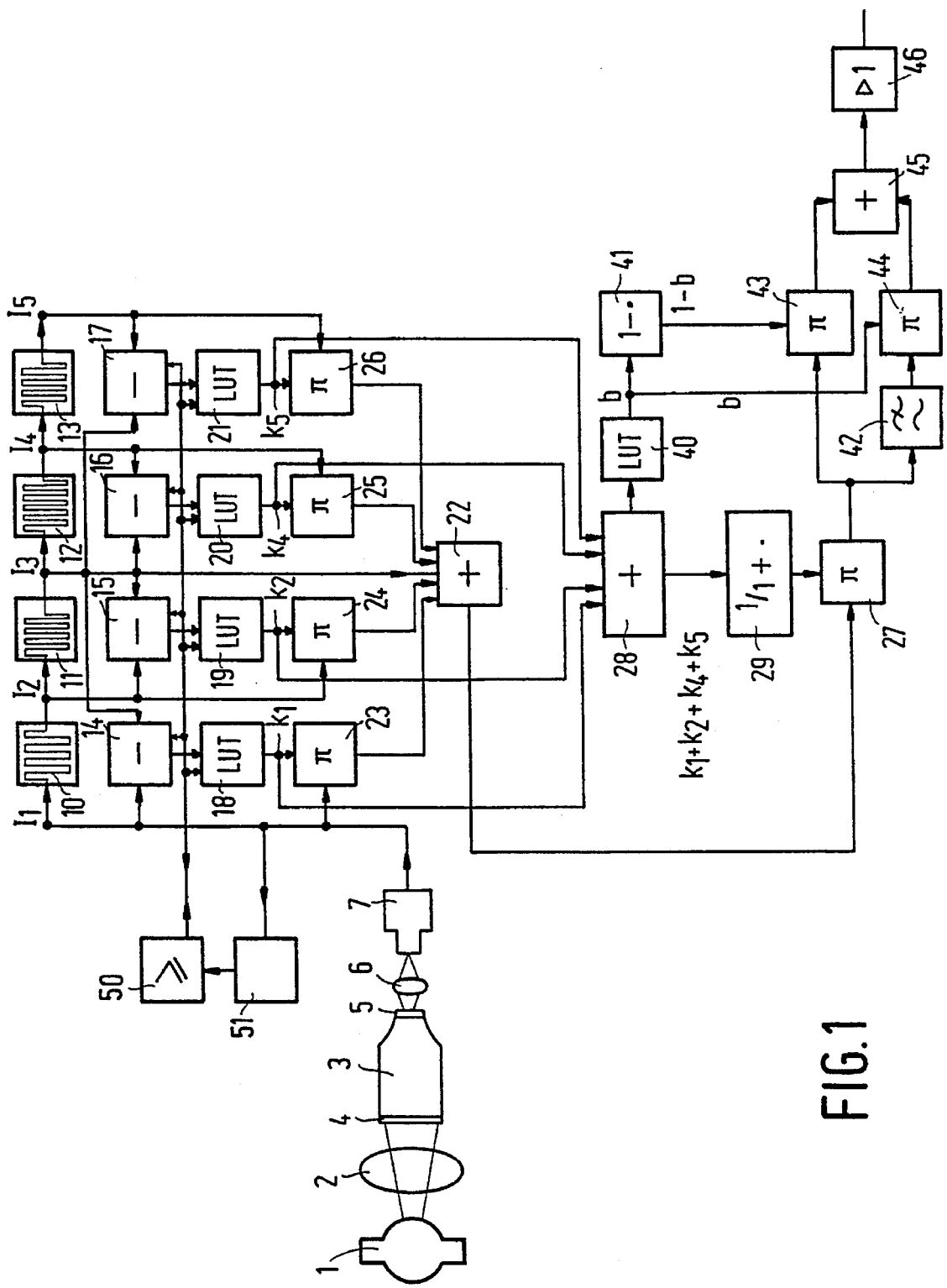
FIG. 1 shows a schematic block diagram of an embodiment of an x-ray examination apparatus in accordance with the invention.

FIG. 1 shows a schematic of an embodiment of an x-ray examination apparatus in accordance with the invention, notably comprising means for averaging a time-sequence and means for spatially averaging. An x-ray source 1 is provided for generating a beam of x-rays 2 which is directed to an object 2, e.g. a patient. The x-rays are attenuated by the object and the attenuated x-radiation is collected by an x-ray image intensifier 3 having an input screen 4 and an output screen 5. An x-ray image collected on said input screen is converted into a visible image on the output screen. By means of an optical arrangement 6 said visible image is imaged onto a video camera 7, whereby the visible image is converted into an electrical video signal. The video signal is fed into a noise reduction circuit of which successive frame delay elements are a part. In the figure frame delay elements 10,11,12 and 13 are shown. Noise reduction for an image produced in the form of video signals is carried out as follows. First a temporal averaging is performed involving weight factors depending on presence of motion in the image. Further noise reduction is performed, notably in parts of the image involving motion and where temporal motion is consequently reduced, by forming a spatially filtered image. A spatially filtered image and a temporal averaged image are combined into a convex combination that is finally output from the noise reduction means. As a consequence video signals pertaining to a set of images in the form of a time sequence of successive images are available at positions indicated by $I_1, I_2, I_3, I_4$ and $I_5$, respectively. The embodiment shown in FIG. 1 is discussed with the help of a time-sequence of five successive images; it is to be noted that the particular number of five successive images is not at all essential for the operation of an embodiment in accordance with the invention. Motion detection means are provided comprising subtractors for computing differences of pixel-values pertaining to pairs of successive images. By means of subtractors 14, 15, 16 and 17, differences of pixel-values pertaining to pairs of successive images are computed. Said differences are each fed into respective look-up tables, that are denoted by reference numerals 18, 19, 20 and 21, being a further part of the motion detection means. The respective look-up tables produce weight factors denoted as $k_1, k_2, k_4$ and $k_5$, having values that decrease as the differences computed by subtractors means 14, 15, 16 and 17 respectively have increasing magnitudes. By way of a comparator 50, the respective differences computed by subtractors 14,15, 16 and 17 are compared to a threshold value provided by a threshold-determination elements 51. Whenever a relevant difference as computed by any of the subtractors 14, 15, 16 or 17 has a magnitude exceeding the threshold value, then a relevant weight factor from the set $\{k_1, k_2, k_4, k_5\}$ is set to zero or to a very small value, e.g. less than ¼. A weighted average of pixel-values for a time-sequence of successive images is now computed from the time-sequence of images $I_{1-5}$ in the following manner. Pixel-values pertaining to image $I_n$ are multiplied by weight factors $k_n$, for n=1, 2, 4, 5, respectively, by way of respective multipliers 23, 24, 25 and 26. Pixel-values of a predetermined image, here chosen to be the image $I_3$ are passed to an adder 22, in other words these pixel-values are multiplied by unity. The results of the multiplication by said weight factors of said pixel-values are passed to the adder 22. The result of addition by way of adder 22 of pixel-values of image $I_3$ with weighted pixel-values of images $I_{1,2,3,4,5}$ is a weighted sum of pixel values. This weighted sum is further passed to a further multiplier 27 to be converted in a normalised weighted average. To that end a further adder 28 is provided for computation of the sum $k_1+k_2+k_4+k_5$. To compute a required value of a normalisation constant there is provided a computation element 29 for computing a multiplicative normalisation factor $N =1/(1+k_1+k_2+k_4+k_5)$. By way of multiplier 27 the weighted sum of pixel-values produced by adder 28 is multiplied by the normalisation factor produced by computation element 29, so as to provide normalised weighted averages of pixel-values, thereby forming a weighted temporal averaged video signal.

To reduce noise-breakthrough, spatial filtering, e.g. denoted as 'blurring' hereinafter, is performed in dependence on the weight factors being determined by the motion detection means. The sum $k_1+k_2+k_4+k_5$ as computed by the adder 28 is further employed for performing blurting. To that end the value of the sum $k_1+k_2+k_4+k_5$ is supplied to a look-up table 40 that provides a value for a weight factor b. The look-up table 40 is configured such that the value of b increases as the value of the sum $k_1+k_2+k_4+k_5$ decreases. A further computing element 41 is configured for computing a value of 1-b. The weighted averaged video signal produced by computation element 29 is passed through a low-pass filter 42 so as to produce a spatially filtered component of the weighted averaged video signal. To produce a convex combination of the weighted temporal averaged video signal and the low-spatial-frequency component of the weighted temporal averaged video signal, the weighted temporal averaged video signal is multiplied by the factor 1-b by means of multiplier 43 and the low-spatial-frequency component of the weighted temporal averaged video signal is multiplied by the factor b, by way of multiplier 44. Finally, the required convex combination is computed by adding the results produced by multipliers 43 and 44, by means of adder 45. Thus the circuit means formed by the look-up table 40, computing element 41, multipliers 43 and 44, low-pass filter 42 and adder 45 constitute means for spatial filtering the weighted temporal averaged video signal in dependence of the result produced by the motion detection means, in that a convex combination is produced of the normalised weighted averaged video signal and a low-spatial frequency component of the actual video signal. The convex combination is formed by the adder 45 an supplied to and output buffer circuit means 46.

Figure 2:
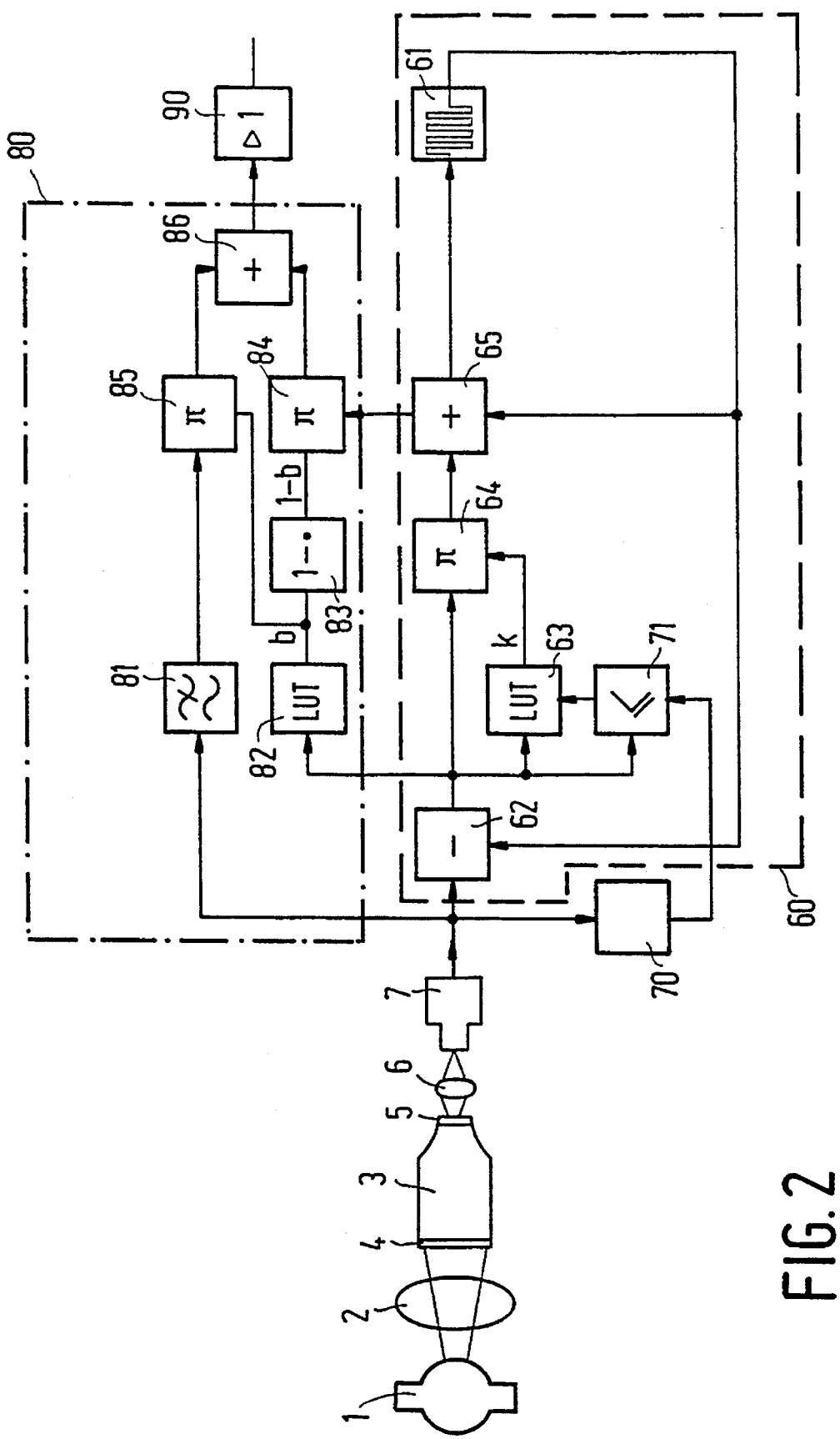
FIG. 2 shows a schematic block diagram of an embodiment of an x-ray examination apparatus in accordance with the invention notably comprising means for recursively averaging and means for spatially filtering.

FIG. 2 shows a schematic of an embodiment of an x-ray examination apparatus in accordance with the invention notably comprising means for recursively averaging and means for spatial filtering. Circuit means 60 for recursively averaging are shown within the dashed box. A video signal S(t) pertaining to an actual image at time t is generated by the video camera 7 and a video signal S(t-τ) pertaining to a preceding image is produced by frame delay element 61. The delayed signal pertaining to the preceding image is subtracted from the actual signal by means of a subtractor 60 and the result of the subtraction is supplied to a look-up table 63 that produces a value for a recursion factor k, said value being decreasing when the magnitude of the result of the subtraction increases. Subsequently, a multiplier 64 is provided for multiplying the result of the subtraction produced by subtractor 62 by the recursion factor k, i.e. there is computed the value of $k[S(t)-S(t-τ)]$. Finally, recursive temporal averaging is completed by adding the video signal pertaining to the delayed image to the result of the multiplication performed by multiplier 64. Viz. adder 65 is provided for computing a value of $S(t-τ)+k[S(t)-S(t-τ)]= kS(t)+(1-k)S(t-τ)$, so that the adder 65 produces at every stage a convex combination of an actual image and a delayed image. Therefore, recursively temporal averaging of an actual image with its past is performed. For pixels involved in motion, recursive averaging should preferably be omitted so as to avoid trailers in the image. To that end, the subtractor 62 operates also as a motion detection means. The difference of an actual video signal and a delayed video signal is attributed to motion whenever said difference has a magnitude exceeding a threshold-value. The threshold-value is computed by a threshold-determination element 70 using pixel values of the actual image. The difference of pixel-values of the actual video signal and the corresponding pixel-values of the delayed signal as computed by subtractor 62 are compared to the threshold-value provided by the threshold-determination element 70, by employing a comparator 71. In case a difference at issue exceeds the threshold-value then the value of the recursion factor k is set to zero, so that recursive averaging is then omitted.

For avoiding noise breakthrough whenever pixels involved in motion are not recursively averaged, further circuit means 80 are provided for performing spatial filtering. The actual video signal is passed through a low-pass filter 81 for producing a low-spatial-frequency component of the video signal of the actual image. The difference of the signals pertaining to the actual image and the recursively averaged image is supplied to a look-up table 82, which produces a value for a weight factor b. By way of computing element 83 a value for 1-b is computed. Subsequently, the recursively averaged signal as produced by the adder 65 is multiplied by means of a multiplier 84 by the value of 1-b. Together with the low-spatial-frequency component of the actual video signal, the value of b is supplied to a further multiplier 85, which multiplies the low-spatial-frequency component of the actual video signal by the weight factor b. Finally, an adder 86 computes, employing the results produced by the multiplier, 84 and 85, a convex combination of the recursively averaged signal and the low-spatial-frequency component of the actual signal; said convex combination is supplied to an output buffer circuit 90.

Threshold-determination elements such as indicated in FIG. 1 and in FIG. 2 by reference numerals 51 and 70, respectively, comprises means for dividing a central region of interest of an image into portions of preferably 32×32 pixels, means for determining for each of said portions a maximum of differences between pixel-values of corresponding pixels of successive images and means for determining a minimum of said maxima of differences. A division of a central region of interest into portions of 32×32 pixels has empirically been found to yield reliable results for the threshold-value. If said portions are chosen to be larger, the probability of not having any motionless portion increases to an unacceptable level, if on the other hand, said portions are chosen to be smaller the statistical variation of the maxima for each of the portions increases so that the probability of finding a threshold-value that is too low increases to an unacceptable level. The minimal smallest of the maxima of the pixel-differences portion that is computed by the threshold determination element is employed as a thresh-old-value for discriminating between noise and motion. Instead of employing a maximum of differences between pixel values of successive images one can as an alternative employ other statistical parameters of the distribution of differences of pixel-values of successive images, e.g. one may use an average or a standard deviation.

Further refinement of determining a threshold-value is achieved by employing a simple function of such a statistical parameter. For many sequences of medical x-ray images it has been found that noise reduction can be improved by employing a coefficient times the smallest of the pixel difference maxima. An optimum value of said coefficient can be found empirically.

Another refinement is related to distinguishing noise from motion in a situation when the patient is moved during the x-ray examination. In such a situation preferably the maximal maximum pixel-difference per portion as computed, and a fraction of said largest of the maxima is employed as a threshold value. During motion of the patient the threshold value has a high value so that temporal filtering is improved. Upon terminating motion of the patient, the threshold value decreases rapidly and temporal filtering for removing noise is restored.

We claim:

1. An X-ray examination apparatus for producing successive x-ray images comprising an x-ray detector for converting the successive images into information signals and noise reduction means for processing said signals for purposes of reduction of noise in an image in a predetermined position in a sequence of said x-ray images, said noise reduction means comprising means for weighted temporal averaging said image in said predetermined position in time with images from said sequence preceding said predetermined position and with images from said sequence succeeding said predetermined position using weight factors, and motion detection means which comprises means for generating weight factors for said weighted temporal averaging in dependence on differences between images of said sequence.

2. An x-ray examination apparatus as claimed in claim 1, further characterised in that said noise reduction means comprises means for spatial filtering images and comprises computing means for computing a convex combination, in dependence on values of the weight factors generated by the motion detection means, of a weighted temporally averaged image and a corresponding spatially filtered image.

3. An x-ray examination apparatus as claimed in claim 1, further characterised in that said noise reduction means further comprises threshold-determination means for computing a threshold-value for controlling weighted temporal averaging on the basis of pixel-values in portions of images generated by the x-ray detector.

4. An x-ray examination apparatus as claimed in claim 1, wherein said means for weighted temporal averaging is arranged for weighted temporal averaging pixel-values of pixels of corresponding values of images from said sequence of images, and said motion detection means comprises means arranged for generating weight factors for said weighted temporal averaging in dependence on differences between pixel-values of corresponding pixels of images of said sequence.

5. An x-ray examination apparatus as claimed in claim 4, further characterized in that said noise reduction means comprises means for spatial filtering images and comprises computing means for computing a convex combination, in dependence on values of the weight factors generated by the motion detection means, of a weighted temporal averaged image and a corresponding spatial filtered image.

6. An x-ray examination apparatus as claimed in claim 1, further characterised in that said means for weighted temporal averaging is arranged for recursive temporal averaging.

7. An x-ray examination apparatus as claimed in claim 6, further characterized in that said noise reduction means comprises means for spatial filtering images and comprises computing means for computing a convex combination, in dependence on values of the weight factors generated by the motion detection means, of a weighted temporal averaged image and a corresponding spatial filtered image.

8. An x-ray examination apparatus as claimed in claim 6, further characterized in that said noise reduction means further comprises threshold-determination means for computing a threshold-value for controlling weighted temporal averaging on the basis of pixel-values in portions of images generated by the x-ray detector.

9. An X-ray examination apparatus for producing successive x-ray images comprising an x-ray detector for converting the successive images into information signals and noise reduction means for processing said signals for purposes of reduction of noise in said x-ray images, said noise reduction means comprising means for weighted temporal averaging a temporal sequence of said images using weight factors, motion detection means comprising means for generating weight factors for said weighted temporal averaging in dependence on differences between images of said sequence, and means for spatial filtering images including computing means for computing a convex combination, in dependence on values of the weight factors generated by the motion detection means, of a weighted temporal averaged image and a corresponding spatial filtered image.

10. An x-ray examination apparatus as claimed in claim 9, wherein said noise reduction means is arranged for correcting a predetermined image in said sequence of successive image by averaging said predetermined image with images from said sequence preceding said predetermined image and with images from said sequence succeeding said predetermined image.

11. An x-ray examination apparatus as claimed in claim 9, further characterized in that said noise reduction means is arranged for correcting a predetermined image in said sequence of successive image by averaging said predetermined image with images from said sequence preceding said predetermined image and with images from said sequence succeeding said predetermined image.

12. An x-ray examination apparatus as claimed in claim 9, further characterized in that said noise reduction means further comprises threshold-determination means for computing a threshold-value for controlling weighted temporal averaging on the basis of pixel-values in portions of images generated by the x-ray detector.

13. An x-ray examination apparatus as claimed in claim 9, further characterized in that said means for weighted temporal averaging is arranged for recursive temporal averaging.

14. An x-ray examination apparatus as claimed in claim 13, further characterized in that said noise reduction means comprises means for spatial filtering images and comprises computing means for computing a convex combination, in dependence on values on the weight factors generated by the motion detection means, of a weighted temporal averaged image and a corresponding spatial filtered image.

15. An x-ray examination apparatus as claimed in claim 14, further characterized in that said noise reduction means further comprises threshold-determination means for computing a threshold-value for controlling weighted temporal averaging on the basis of pixel-values in portions of images generated by the x-ray detector.

16. An x-ray examination apparatus as claimed in claim 9, wherein said means for weighted temporal averaging is arranged for weighted temporal averaging pixel-values of pixels of corresponding values of images from said sequence of images, and said motion detection means comprises means arranged for generating weight factors for said weighted temporal averaging in dependence on differences between pixel-values of corresponding pixels of images of said sequence.

17. An x-ray examination apparatus as claimed in claim 16, further characterized in that said noise reduction means further comprises threshold-determination means for computing a threshold-value for controlling weighted temporal averaging on the basis of pixel-values in portions of images generated by the x-ray detector.

18. A noise reduction apparatus for processing successive x-ray images, said apparatus comprising means for weighted temporal averaging an image at predetermined position in time in a temporal sequence of said x-ray images] with images from said sequence preceding said predetermined position and with images from said sequence succeeding said predetermined position using weight factors, and motion detection means which comprises means for generating the weight factors for said weighted temporal averaging in dependence on differences between images of said sequence.

19. A noise reduction apparatus as claimed in claim 18, wherein said means for weighted temporal averaging is arranged for recursive temporal averaging.

20. A noise reduction apparatus as claimed in claim 18, wherein that said noise reduction means comprises means for spatial filtering images and comprises computing means for computing a convex combination, in dependence on values of the weight factors generated by the motion detection means, of a weighted temporal averaged image and a corresponding spatial filtered image.

* * * * *